United States Patent [19]
Langsley

[11] 3,985,710
[45] Oct. 12, 1976

[54] ANTIOXIDANTS

[75] Inventor: Gerald William Langsley, Baslow, via Bakewell, England

[73] Assignee: Coalite and Chemical Products Limited, Chesterfield, England

[22] Filed: Nov. 8, 1974

[21] Appl. No.: 522,147

[30] Foreign Application Priority Data
Nov. 9, 1973  United Kingdom............... 52160/73
Aug. 7, 1974  United Kingdom............... 10305/74

[52] U.S. Cl............................. 260/48; 260/53 R; 260/55; 260/601 R
[51] Int. Cl.²....................................... C08G 75/04
[58] Field of Search............... 260/48, 601 R, 53 R, 260/55

[56]  References Cited
UNITED STATES PATENTS
2,794,049  5/1957  Thompson .................... 260/601 R
3,408,327  10/1968  Labat.................................. 260/48
3,455,851  7/1969  Meredith et al...................... 260/48

Primary Examiner—Donald E. Czaja
Assistant Examiner—H. H. Fletcher
Attorney, Agent, or Firm—Foster York

[57]  ABSTRACT

A condensation product of a mercaptoaldehyde, e.g. butylmercaptopropionaldehyde, and phenol or a phenol having a substituent ortho or para to the hydroxyl group and being unsubstituted in a position ortho or para to the hydroxyl group, e.g. o-cresol, has free radical inhibiting and hydroperoxide decomposing properties. The condensate also has metal deactivating properties when the phenol has a halogen in an ortho or para position. The condensate which may be a bisphenol or a liquid or solid resinous material, is particularly useful as an antioxidant in liquid hydrocarbons.

28 Claims, 1 Drawing Figure

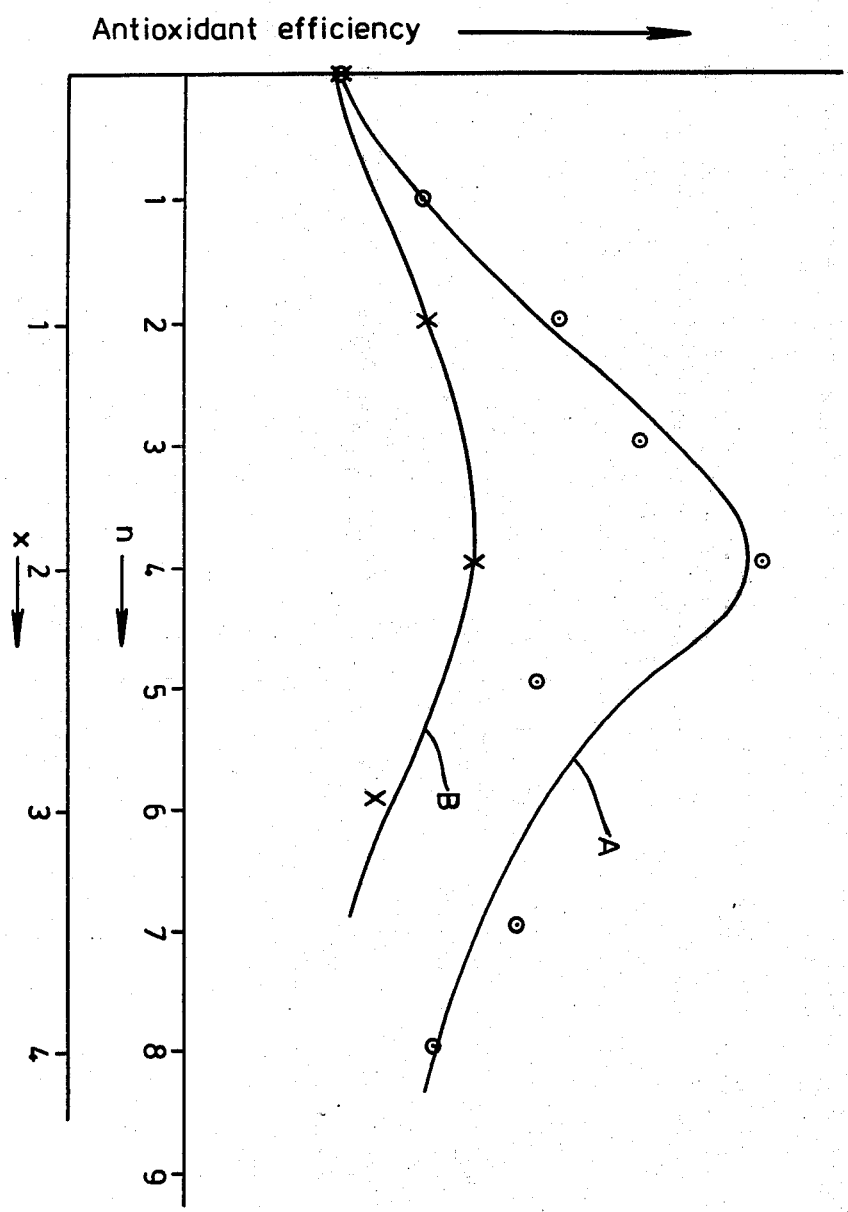

ANTIOXIDANTS

The invention relates to antioxidant condensates or resins and to a process for their production.

The function of an antioxidant is to prevent the oxidation of some organic material thus increasing the useful lifetime of that material. The process of oxidation is rather complex, but the following generalised scheme demonstrates the more important features of autoxidation processes.

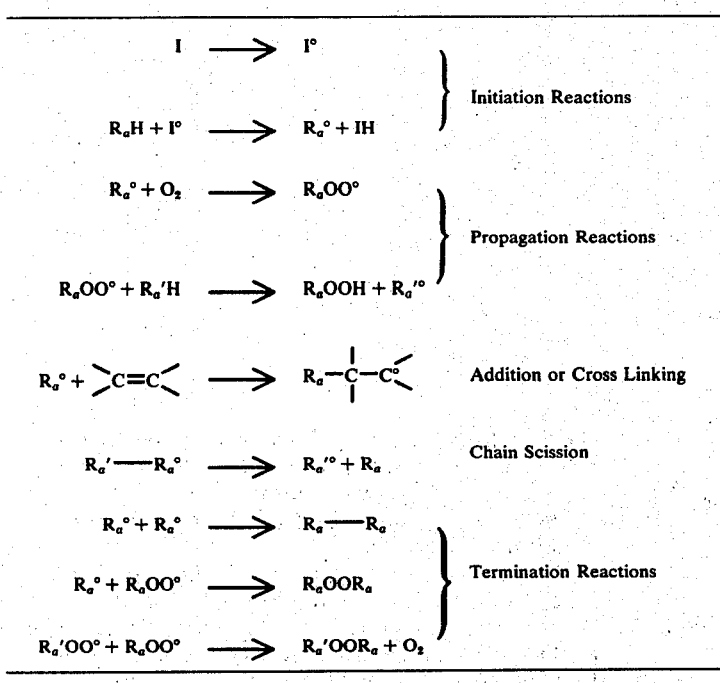

I or IH is a species which forms the free radicals I· and $R_aH$ is an organic substrate.

Any oxidation requires an initiation process which generates free radicals from the substrate. These free radicals are able to react with atmospheric oxygen, a particularly facile reaction resulting from the diradical nature of the oxygen molecule, to give a peroxy radical. This peroxy radical is very reactive and will rapidly abstract a hydrogen atom from the surrounding medium or substrate to yield a new free radical and a hydroperoxide molecule. Since a new free radical is generated at each step, more oxygen is incorporated into the system as this chain reaction proceeds, and the reaction is terminated only when two free radicals combine to form a non-radical product. During the course of the chain reaction chain scission can occur, usually with the introduction of an oxygen function into the molecule which often acts as a photo-sensitiser, absorbing light or ultra-violet radiation and generating further free radicals to initiate further oxidation, introducing discolouration and, most important, breaking down the substrate molecules. In unsaturated systems, the free radicals can add to centers of unsaturation, generating a new free radical and joining two substrate molecules together. These are two of the destructive elements of oxidation, causing gross changes in the chemical and physical properties of the substrate.

The hydroperoxide molecules generated in the propagation reaction are thermally unstable, and generally undergo heterolytic fission to yield two free radicals. These are able to initiate further chain reactions, and so the whole process may be said to be autocatalytic. In order to suppress oxidation, the addition of an antioxidant is required, and this may function in several ways, either interfering with the chain reaction mechanism or by suppressing initiation reactions.

The phenolic antioxidants and the aromatic amine antioxidants, for example BHT (butylated hydroxytoluene), BHA (butylated hydroxy anisole), methylene bisphenol and diphenylamines, act by interacting with free radicals present in the system, forming a non-radical substrate product and a phenoxy or phenimino radical by donation of a hydrogen atom from the antioxidant to the substrate radical:

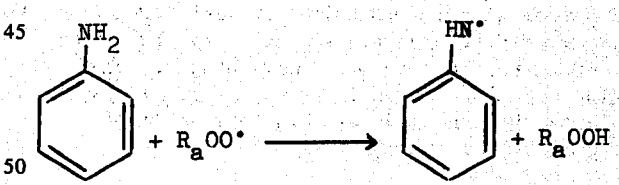

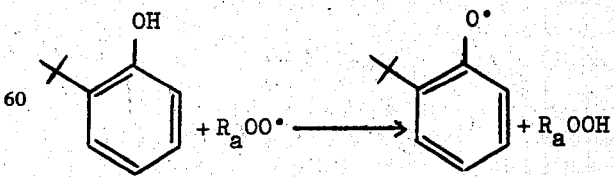

If the resulting antioxidant radical is well stabilised, or sterically prevented from reacting further, then it will not act as an initiator of further reaction. It may, in fact, react with a second free radical in the system, thus interacting with two radical chain reactions.

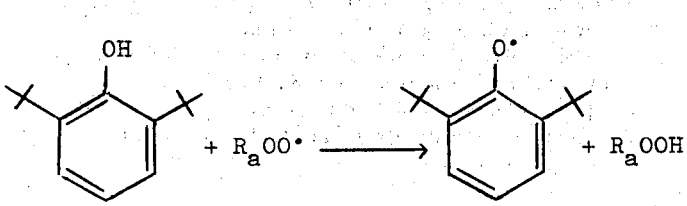

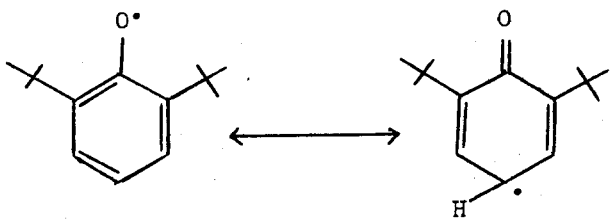

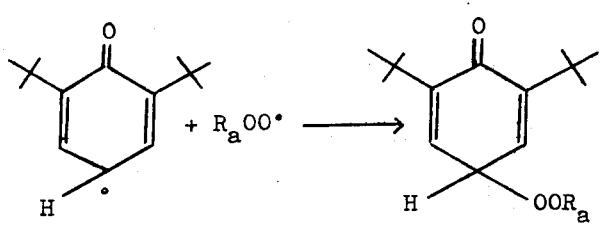

The processes shown above do generate hydroperoxide molecules however, and so only shorten the chain reaction, leaving behind a molecule capable of initiating a further chain of reactions.

A second type of antioxidant, of whih dilauryl thiodipropionate is a typical example, functions in such a way as to remove hydroperoxide molecules from the system by a mechanism not involving free radicals. This mechanism with dilauryl thiodipropionate as the antioxidant, is depicted in the three following formulae in which $R_\varphi$ denotes the lauryl group:

The hydroperoxide molecule $R_aOOH$ is bonded to the antioxidant via a hydrogen bond, and the steric arrangement is such that a bond migration occurs to yield an alcohol and an oxidised form of the thioether. The molecule containing the oxidised sulphur atom is capable of reacting with a further molecule of hydroperoxide. This mode of operation introduces hydroxyl groups into the substrate.

The phenomenon of synergism is also well known. When two antioxidants, one a free radical inhibitor and the other a hydroperoxide decomposer, are used in combination, the overall effect is more than additive. Hence a mixture of butylated para-cresol (BHT) and dilauryl thiodipropionate (DLTDP) is commonly used to great effect in some polymer systems. The reasons for this synergistic effect is quite obvious when looked at in the light of the scheme of oxidation hereinbefore set forth, since the removal of hydroperoxide molecules will grossly reduce the rate of chain initiation, and the radical inhibitor will stop the progress of any chain reactions, such as those initiated by photosensitisation or by the presence of traces of metal oxidation catalysts. Any hydroperoxide molecules generated will be eliminated by the hydroperoxide decomposing antioxidant.

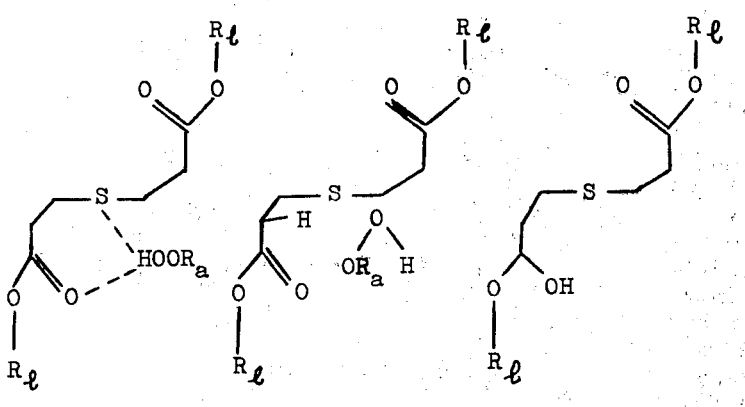

This synergistic effect is illustrated by the following data:

| COMPOUND | INDUCTION PERIOD IN LIQUID PARAFFIN AT 150°C. |
|---|---|
| 2,2'-Methylene bis(6-t.butyl-4-methylphenol) | 12.7 hours |
| Di-n-decyl sulphide | 12.2 hours |
| Combination of the above at the same concentrations | 54.7 hours |

A third type of stabiliser which can prevent oxidation occurring is the metal deactivating antioxidant. Initiation of oxidation can be brought about by the electron exchange reaction between the substrate and a metal ion of variable valence, for example

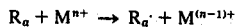

Here the metal is reduced and a free radical is produced. The metal ion may subsequently be re-oxidised by oxygen from the atmosphere or by other mechanisms to regenerate the oxidation catalyst:

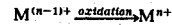

This process of initiation is well known and is used purposely to initiate oxidation in processes such as the drying of paint films, where materials such as cobalt naphthenate are employed. The requirements of such oxidation catalysts is that the valency state is stabilised by the ligands both before and after oxidation. The usual method of deactivating adventitious metal catalysts is by complexing them in a system where only one valency state is stable or by removing them as inorganic metal salts.

An antioxidant should be non-volatile. If a volatile antioxidant is used, it is likely that some of it will be lost from the system during processing or during use leaving behind a non-stabilised product. The volatility of an antioxidant is related to its molecular weight, and hence in this respect at least, compounds of high molecular weight are advantageous. Over the years, the development of antioxidants with increasing molecular weight is readily seen in the literature, progressing from simple phenols such as BHT, with a relatively high volatility, through the bisphenols to molecules where 3, 4 or even 5 molecules of a 2,6-disubstituted phenol are incorporated into one molecule.

Another important factor in the choice of an antioxidant is the degree of compatibility between the antioxidant and the substrate. If the two are incompatible, compounding becomes difficult and the antioxidant will tend to form aggregates in the system, leaving large volumes of unstabilised material. Since the centres of antioxidant activity are, in general, polar groups, there is a certain incompatibility between substrate and antioxidant. This can be overcome by incorporating hydrophobic groups into the molecule. This however increases the molecular weight of the compound, and hence lowers the antioxidant activity of the compound on a weight for weight basis. The conflicting effects of simultaneously increasing the molecular weight of the antioxidant and its compatibility with the substrate are hereinafter referred to.

It is an object of the invention to provid an antioxidant a molecule of which embodies both free radical inhibiting and hydroperoxide decomposing properties.

It is a further object of the invention to provide an antioxidant compound which has free radical inhibiting, hydroperoxide decomposing and metal deactivating properties.

It is another object of the invention to provide a process for the production of antioxidants the activity of which can be "tailored" or made suitable for use in a particular application of environment.

Other objects and advantages of the invention will become apparent from the following detailed description, reference being had to the graph in the accompanying drawing which shows plots of the antioxidant efficiency of two series of phenolic antioxidant resins shown on page 21 of the specification plotted against a number related to the molecular weight, the efficiency being given by referring to the ordinate of the graph and the number related to the molecular weight being given by referring to $n$ or $x$ on the abscissa of the graph, $n$ and $x$ being 0 or an integer and being the number of methylene groups in the two series of resins.

According to the invention there is provided a resin which is the condensation product of (1) a mercaptoaldehyde and (2) phenol(hydroxybenzene) or a phenol containing a substituent in a position ortho or para to the phenolic hydroxyl group and which is unsubstituted in at least one of the two remaining positions ortho and para. Both of said two remaining positions ortho and para may be and preferably are unsubstituted. It will be understood that the resin may be the condensation product of more than one mercaptoaldehyde and/or more than one of the phenols. The resin may also contain residues of minor amounts of other reactants or monomers.

According to the invention furthermore, there is provided a process for the production of a sulphur-containing phenolic resin which comprises subjecting a mercaptoaldehyde to condensation with a phenol of the kind hereinbefore specified. The condensation reaction is preferably effected under an inert atmosphere, for example under nitrogen.

According to the invention moreover, there is provided a method for the production of a mercaptoaldehyde which comprises reacting an unsaturated aldehyde, preferably an open chain aldehyde, particularly acrolein or crotonaldehyde, with a mercaptan, particularly an alkyl mercaptan.

The resin which contains phenolic groups and one or more sulphide linkages, has good antioxidant properties and may, for example, be used as a radical scavenger and hydroperoxide decomposer. Its properties as a metal deactivator may be ensured by providing ortho- or para-halogen atoms in the aromatic rings. The resin is of relatively high molecular weight and low volatility and may be a bisphenol or it may contain more than two (for example from 3 to 6 or more) phenolic nuclei in its molecule. The resin is thermally stable up to relatively high temperatures, is soluble in many organic solvents, and at 20° C is in the form of a viscous liquid, a glassy solid which flows freely at 60° – 80° C or a (finely divided) solid which softens in the range 50° – 80° C. The colour of the resin may vary from a light yellow to dark brown or black.

The invention further provides a composition of matter comprising an organic substrate and a minor amount of the sulphur-containing resin. The organic substrate may, for example, consist of a hydrocarbon which may at 20° C be a liquid or solid, for exmple, a mineral or synthetic lubricating oil, or it may be a polymeric substance such as a synthetic thermoplastic substance, for example a polyolefin, or a natural or synthetic rubber. The substrate may also be a hot melt adhesive. The sulphur-containing resin will be present in an amount sufficient to have an antioxidant effect and it may form 0.05 – 10%, preferably 0.1 – 3%, by weight of the composition. The resin will be present substantially uniformly throughout the composition.

The preferred mercaptoaldehydes used in the production of the resin have the general formula:

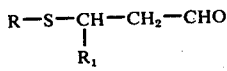

in which R is a $C_1$–$C_{17}$ alkyl group which may be a straight or branched chain e.g. lauryl, decyl, octyl, heptyl, pentyl, isobutyl or ethyl, and $R_1$ denotes hydrogen or a lower alkyl group, for example a $C_1$ – $C_4$ alkyl group, particularly methyl. The alkyl group R is advantageously a straight chain group and preferably contains from 2 to 12 carbon atoms, particularly from 2 to 8 carbon atoms, and especially from 3 to 6 carbon atoms. The mercaptoaldehyde is suitably produced by reacting the mercaptan RSH with the appropriate unsaturated aldehyde $R_1CH = CHCHO$ at a temperature of from −30° C to +30° C, preferably at a temperature in the range 0°–15° C, in the presence or absence of a basic catalyst, for example piperidine, and preferably in an inert atmosphere, for example nitrogen. The reaction time may be 1–150 hours but the reaction conditions are preferably such that the reaction is complete within from 2–100 hours.

The phenol used in the production of the resin suitably has the general formula:

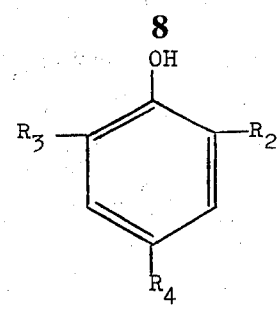

in which at least one of $R_2$, $R_3$ and $R_4$ denotes hydrogen and at least one denotes a substituent, or it may be phenol (hydroxybenzene) itself in which case each of $R_2$, $R_3$ and $R_4$ denotes hydrogen. Preferred substituents in one or both ortho positions ($R_2$ and $R_3$) include aliphatic and cycloaliphatic hydrocarbyl groups, for example, alkyl, alkenyl, cycloalkyl and cycloalkenyl groups, particularly those containing not more than 8 carbon atoms such as methyl, t-butyl, allyl and cyclohexyl groups, and halogen atoms, particularly chlorine or bromine. When $R_4$ denotes a substituent, it may be a $C_1$ – $C_8$ alkyl or other hydrocarbyl group, preferably a $C_1$ – $C_4$ alkyl group, particularly methyl, or it may be a halogen, for example chlorine or bromine. The phenol is preferably a monosubstituted phenol, for example, o-cresol, o-allylphenol and p-chlorophenol. Other suitable phenols include o-t.butylphenol, o-cyclohexylphenol, o-chlorophenol, p-chloro-o-cresol, p-methyl-o-ethylphenol and o,p-dimethylphenol.

The phenol and the mercaptoaldehyde are suitably reacted in a phenol/aldehyde molar ratio of from 0.5:1 to 8:1, preferably from substantially 1:1 to substantially 4:1, at a temperature in the range from −30° C to +150° C, advantageously rom 0° C to 80° C and preferably from 10° C to 50° C, in the presence or absence of a solvent, for example, toluene. This condensation reaction is preferably carried out in the presence of a mercaptan catalyst and with HCl as co-catalyst. When a mercaptan catalyst is used, the mercaptan may be present as an impurity in the mercaptoaldehyde, in which case no separate addition of mercaptan will be required. The condensation reaction may take from 1 to 24 hours but is preferably carried out under such conditions that it is complete within 2–15 hours. The product resin may be recovered by removing the volatile components from the reaction mixture, for example by heating to 220° C under fairly high vacuum, e.g. 3 mm Hg. The residue from such heating may be used as it is or it may be further purified, at least in some cases, by recrystallisation, for example, from petroleum ether.

Preferred antioxidant resins according to the invention have the general formula:

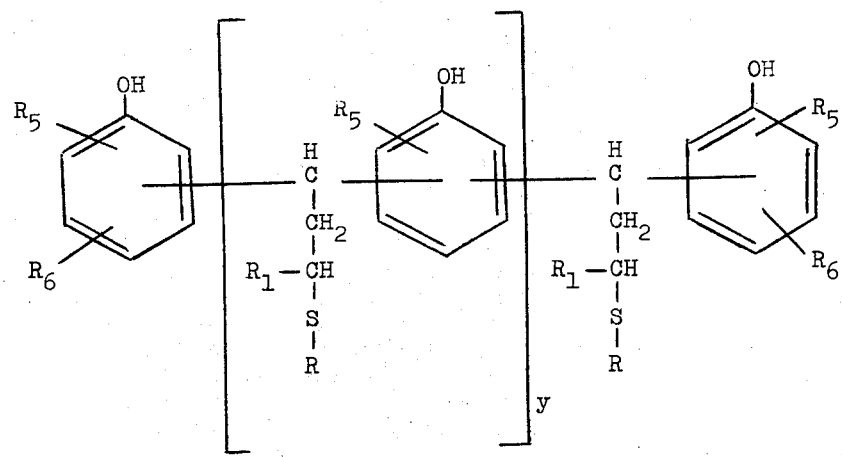

in which the linkage between between phenolic nuclei through the group RS CH($R_1$) $CH_2$ CH< is by ortho and/or para substitution, the other ortho and/or para position(s) being occupied by $R_5$ and $R_6$ which are the same or different and each of which denotes hydrogen, a halogen, preferably chlorine or bromine, or a $C_1 - C_8$ aliphatic hydrocarbyl group; R denotes a $C_1 - C_{17}$ alkyl group; $R_1$ denotes hydrogen or a lower alkyl group; and y is zero or a positive integer. When either $R_5$ or $R_6$ is a hydrocarbyl group, it may be saturated or unsaturated and is preferably alkyl or alkenyl, for example methyl or allyl.

The resins provided according to the invention may be said to be of three general types, namely (1) general antioxidants (2) reactive antioxidants or (3) metal deactivating antioxidants.

The invention is illustrated in the following examples.

EXAMPLE 1

0.02 gm Piperidine (catalyst) was dissolved in 30 ml diethyl ether, 0.5 mole lauryl mercaptan was added and the mixture was cooled to 10° C. To this mixture was added 0.5 mole of crotonaldehyde, the rate of addition being such that the reaction temperature never exceeded 10° C. After the addition was completed, the reaction mixture was maintained at a temperature of less than 10° C for a further 60 hours. The reaction mixture was kept under a blanket of nitrogen throughout the preparation. The product β-lauryl-mercaptobutyraldehyde was then obtained by distillation of the mixture under reduced pressure, the product being the fraction of boiling point 154°–155° C at 3 mm Hg pressure. The yield was 90%.

EXAMPLE 2

Into a reaction vessel containing 4 moles of o-cresol which had been saturated with anhydrous hydrogen chloride and which contained 0.5 gm of ethyl mercaptan (catalyst), was drip fed 1 mole of β-lauryl-mercaptobutyraldehyde. The addition of the aldehyde was such that the total addition took 2-3 hours, and the reaction temperature was maintained at 60° C throughout. The reaction mixture was then maintained at the reaction temperature for a further two hours, during which time more dry hydrogen chloride gas was passed through the system. When the reaction was complete, unreacted starting materials and the catalyst were removed by vacuum distillation to leave the product resin as a distillation residue at a pot temperature of 250° C, 12 mm Hg pressure. The yield of resin was 85%.

EXAMPLE 3

A sulphur-containing condensation was produced in a similar manner to that described in Example 2 but using β-ethylmercaptopropionaldehyde instead of β-laurylmercaptobutyroaldehyde. The mercaptoaldehyde had been produced in a manner similar to that described in Example 1 but using ethyl mercaptan and acrolein.

EXAMPLE 4

β-Laurylmercaptobutyroaldehyde produced in the manner described in Example 1 was reacted with o-allylphenol in a manner similar to that used in Example 2.

The antioxidant properties of the sulphur-containing resins produced in Examples 2, 3 and 4 were compared with those of 2,6-di-tertiary butyl-p-cresol, a commonly used antioxidant. The comparison was made in an oxygen absorption test using an A.E.I. oxidation meter. The test procedure comprised blending 1% by weight of the antioxidant with liquid paraffin and observing the time taken for a 10 gm sample of the blend to absorb 30 mls of oxygen at the test temperature of 150° C. The results obtained are shown in the following Table 1.

TABLE 1

| Antioxidant | Time required for a 10 gm sample of liquid paraffin containing 1% of the antioxidant to absorb 30 ml oxygen at 150°C. |
|---|---|
| Blank (i.e. no antioxidant) | 2.7 hours |
| 1% 2,6-di t.butyl-p-cresol | 122.0 hours |
| 1% Resin A | 152.3 hours |
| 1% Resin B | 173.1 hours |
| 1% Resin C | 213.6 hours |

Resins A, B and C are the sulphur-containing resins according to the invention produced in Examples 3, 4 and 2 respectively. Thus resin A was produced from β-ethylmercaptopropionaldehyde (R = $C_2H_5$, $R_1$ = H) and o-cresol ($R_2$ = $CH_3$ and $R_3$ = $R_4$ = H), resin B from β-laurylmercaptobutyraldehyde (R = lauryl, $R_1$ = $CH_3$) and o-allylphenol ($R_2$ = allyl and $R_3$ = $R_4$ = H) and resin C from β-laurylmercaptobutyraldehyde and o-cresol (R = lauryl, $R_1$ = $R_2$ = $CH_3$, $R_3$ = $R_4$ = H). Resin B may be designated a reactive antioxidant and resin C a general antioxidant.

The condensation product or resin according to the invention may be or include a bisphenol and it will be understood that the invention includes such bisphenol.

EXAMPLE 5 n-Butyl mercaptan (1 mole) was stirred with 80–100 petroleum ether (150 ml) at 10° C and piperidine catalyst (0.02 gm) was added. To this, acrolein (1 mole) was added dropwise over a period of 2 hours. The reaction mixture was allowed to warm up to room temperature whereupon stirring was continued for a further 36 hours. The mixture was then distilled under reduced pressure to yield a β-n-butylmercaptopropionaldehyde fraction (0.92 mole) having a boiling range 55°–57° C at a pressure of 1–2 mm of Hg. The reaction mixture was maintained under a blanket of nitrogen at all time throughout the preparation.

EXAMPLE 6

A sulphur-containing resin according to the invention was then prepared by adding the β-n-butylmercaptopropionaldehyde (1 mole), prepared as in Example 5, in a dropwise manner to a stirred reactor containing o-cresol (4 moles) and ethyl mercaptan catalyst (0.02 gm), the reactants in the reactor having been saturated with dry gaseous hydrogen chloride. The passage of hydrogen chloride was continued throughout the rest of the preparation. The addition of the mercaptoaldehyde took place at a reaction temperature of 50°–65° C over a period of 2 hours. After the addition was complete, the reaction mixture was heated to 120° C and maintained at that temperature for a period of 2 hours during which time water (17.8 ml) was distilled off from the mixture. The excess o-cresol was then removed by vacuum distillation at 16 mm Hg pressure, which was continued until the still temperature reached 150° C. The product was then removed from the still to give a viscous golden liquid. The yield was 99%. The reaction was carried out under a nitrogen blanket at all stages.

The resin, i.e. the product, stabilised liquid paraffin in such a way that at 150° C the addition of 1% of the resin increased the time required by a 30 ml sampled of the liquid paraffin to absorb 30 ml of $O_2$ from 2 hours to 357 hours.

EXAMPLE 7

A resin which stabilised liquid paraffin in such a way that at 150° C the resin increased the time required by a 30 ml sample of liquid paraffin to about 30 ml of $O_2$ from 2 hours to 300 hours as prepared as follows:

The resin was prepared by adding the product aldehyde (β-n-butylmercaptopropionaldehyde) (1 mole) produced as in Example 5 in a dropwise manner to a stirred reactor containing o-cresol (1 mole) and reacted according to Example 6. The product was recovered by removing the impurities by vacuum distillation at 14 mm Hg pressure until the still temperature reached 165° C. The product resin was recovered from the still as a yellow glass. The yield was 97.5%.

EXAMPLE 8

A resin which stabilised liquid paraffin in such a way that at 150° C the addition of 1% of the resin increased the time required by a 30 ml sample of the liquid paraffin to absorb 30 ml of $O_2$ from 2 hours to 402 hours was prepared as follows:

The resin was prepared by adding β-n-butylmercaptopropionaldehyde (1 mole), produced as in Example 5, in a dropwise manner to a stirred reactor containing o-allylphenol (1 mole) and reacting according to Example 6. The product resin was recovered by removing the impurities by vacuum distillation at 14 mm Hg pressure until the still temperature reached 200° C. The product resin was recovered as a viscous amber liquid in a yield of 99%.

EXAMPLE 9

Lauryl mercaptan (1 mole) was stirred with diethyl ether (150 ml) at 10° C and to this was added dropwise crotonaldehyde (1 mole) over a period of 2 hours. After the completion of the addition, the reaction mixture was warmed to room temperature and reacted for a further 22 hours. The reaction mixture was then distilled to give a laurylmercaptobutyraldehyde product fraction (0.90 moles) of boiling range 147°–150° C at 1.5 mm Hg. The reaction mixture was maintained under nitrogen at all times.

EXAMPLE 10

An antioxidant resin was prepared by adding the mercaptoaldehyde (1 mole) produced in Example 9 to a stirred reactor containing p-chlorophenol (6 moles) and the mixture was reacted as in Example 6. The product resin was purified by distilling off the impurities at an absolute pressure of 14 mm Hg until the still temperature reached 210°C, when the product resin was recovered as a viscous, black liquid, the yield being 70%.

That product resin stabilised liquid paraffin in such a way that at 150° C the addition of 1% of the resin increased the time required by a 30 ml sample of the liquid paraffin to absorb 30 ml of $O_2$ from 2 hours to 240 hours.

EXAMPLES 11 – 14

Four antioxidant resins were prepared substantially in the manner described in Example 6 from o-cresol and β-ethylmercaptopropionaldehyde (Example 11), β-n-butylmercaptopropionaldehyde (Example 12), β-isobutylmercaptopropionaldehyde (Example 13) and β-laurylmercaptopropionaldehyde (Example 14). The molar ratios of o-cresol : aldehyde in Examples 11 to 14 were, respectively, 4.6:1, 7.5:1, 7.5:1 and 6.5:1. Excess o-cresol and other volatile components were in each case removed by vacuum distillation at 3 mm Hg pressure from the condensation product, the antioxidant resin, the vacuum distillation being continued until the still base temperature reached 250° C at 3 mm Hg. The resin produced in Example 11 was a black solid, that produced in each of Examples 12 and 13 was a viscous amber liquid whilst that produced in Eample 14 was a viscous, dark brown liquid.

Oxygen absorption tests were carried out on the four resins, and the results are shown in Table 2.

TABLE 2

| Ex. | Resin produced from O-cresol and | Time required for a 10 gm sample of liquid paraffin containing 1% by weight of the resin to absorb 30 ml of oxygen at 150°C. |
|---|---|---|
| 11 | β-ethylmercaptopropionaldehyde | 200 hours |
| 12 | β-n-butylmercaptopropionaldehyde | 334 hours |
| 13 | β-isobutylmercaptopropionaldehyde | 303 hours |
| 14 | β-laurylmercaptopropionaldehyde | 165 hours |

By way of comparison, Table 3 shows the results of the oxygen absorption test carried out with samples of the liquid paraffin containing known antioxidants and with a sample of the liquid paraffin containing no antioxidant.

TABLE 3

| Antioxidant | Time required for a 10 gm of liquid paraffin containing 1% by weight of antioxidant to absorb 30 ml of oxygen at 150°C. |
|---|---|
| None | 2.7 hours |
| 2,6-Di-tert.butyl-4-methylphenol | 122 hours |
| Dilauryl thiodipropionate | 127 hours |
| Methylene bis(2-tert-butyl-4-methylphenol) | 96.1 hours |
| Thio bis(2-tert-butyl-4-methylphenol) | 121.4 hours |

The results in Table 2 indicate that there is a relationship between the effectiveness of the resin or its compatibility with the substrate and the molecular weight of the aldehyde used in the production of the resin in that the resins derived from the short and long chain aldehydes (Examples 11 and 14) stabilise the system against oxidation to a lesser extend that the corresponding resins derived from butyraldehyde (Examples 12 and 13). This kind of relationship is similar to that shown by prior phenolic antioxidants and which is illustrated in the accompanying drawing which shows plots of the antioxidant efficiency of two series of phenolic antioxidant resins against a number related to the molecular weight of the particular antioxidant resin. Curve A is a plot of the results obtained with antioxidant resins (bisphenols) of the general formula:

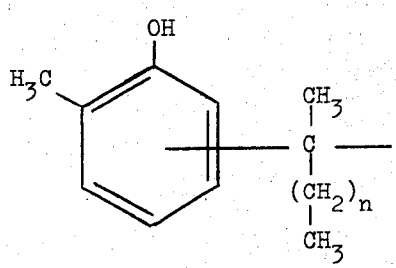

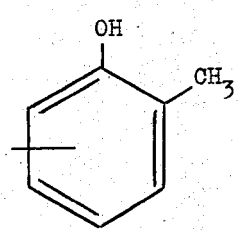

in which $n$ is zero or an integer, and curve B is a plot of the results obtained with antioxidant resins (bisphenols) of the general formula:

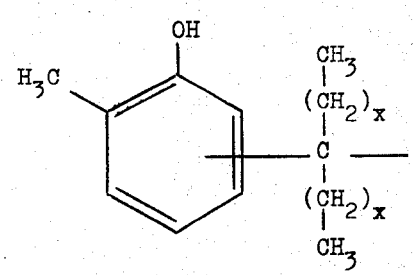

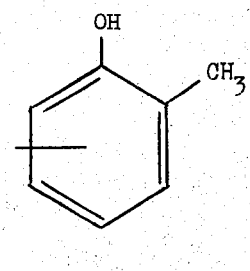

in which $x$ is 0 or an integer.

The drawing shows the conflicting effects of increasing the molecular weight of the antioxidant resins (namely, bisphenols prepared from o-cresol and various dialkyl ketones) and the effectiveness or compatibility of the resins with the substrate. A similar effect may from Table 2 be seen to be present in resins according to the invention. The drawing also shows that there is a peak efficiency in both series of antioxidant resins and that that peak efficiency occurs at the same molecular weight in both cases. The results in Table 2 suggest similar behaviour in resins according to the invention. The drawing also shows that branching of the interlinking alkylidene group in the bisphenol resin reduces the antioxidant activity, presumably because of reduced compatibility between the resin and the substrate. A comparison of the antioxidant effect of the resins of Examples 12 and 13 in Table 2 suggests that branching of the interlinking mercaptoalkylidene group in the resins of the invention also leads to a reduction in antioxidant activity.

As hereinbefore stated, the resin according to the invention contains both phenolic groups and a sulphide linkage. The resin can thus function as a radical inhibitor and as a hydroperoxide decomposer and the effect of these two functions is more than additive, that is, synergism occurs between the two functions in the resin. This is shown in the following Table 4.

TABLE 4

| Compound | Time required for a 10 gm sample of liquid paraffin containing 1% by weight of the compound to absorb 30 ml of oxygen at 150°C |
|---|---|
| Bisphenol from o-cresol and octanal | 24.1 hours |
| Resin from o-cresol and β-n-butyl-mercaptopropionaldehyde | 334 hours |
| β-laurylmercaptobutyraldehyde | 57 hours |

The nature of the resins allows for the introduction of allyl or other unsaturated groups into the structure, so that resins capable of being bonded into rubbers during vulcanisation can be prepared. The resins are soluble in organic solvents. That the allyl group has little effect on the antioxidant properties of the resin is shown in Table 1 where resin C, prepared from o-cresol and β-laurylmercaptobutyraldehyde, had a time of 213.6 hours in the oxygen absorption test and resin B, prepared from o-allylphenol and β-laurylmercaptobutyraldehyde, had a time of 173.1 hours. Any residual allyl groups present in the resin after vulcanisation of the rubber will not interfere with the antioxidant properties of the resin to any substantial extent.

When the resin contains ortho- or para- halogen atoms in the aromatic rings, the resin is also effective as a metal deactivator. This is due to the formation of allylic halogen during the process of oxidation of the resin, and this is able to react with metallic systems and precipitate the metal as its halide. The incorporation off chlorine into the ring gives rise to a resin that is a good antioxidant in the presence of metal complexes. This may be seen from the oxygen absorption test results shown in Table 5.

TABLE 5

| Resin prepared from | Time required for a 10 gm sample of liquid paraffin containing 1% by weight of the resin to absorb 30 ml of oxygen at 150°C in the presence of 100ppm soluble copper (present as copper naphthenate) |
|---|---|
| o-Cresol and β-laurylmercapto-propionaldehyde | 19.1 hours |
| p-Chlorophenol and β-laurylmer- | 49.6 hours |

TABLE 5-continued

| Resin prepared from | Time required for a 10 gm sample of liquid paraffin containing 1% by weight of the resin to absorb 30 ml of oxygen at 150°C in the presence of 100ppm soluble copper (present as copper naphthenate) |
|---|---|
| captobutyraldehyde | |

The resinous antioxidant has also been found to be equally as effective in lubricating oils as it is in liquid paraffin. It is, furthermore, effective in other organic substrates, particularly polymers and hot melt adhesives.

I claim:

1. A resin which is the condensation product of (1) a mercaptoaldehyde and (2) a member of the group consisting of hydroxybenzene and mononuclear, monohydric phenols containing a halogen or a $C_1$–$C_8$ aliphatic hydrocarbyl group as a substituent in a position ortho or para to the phenolic hydroxyl group and being unsubstituted in a position ortho or para to the phenolic hydroxyl group, said mercaptoaldehyde having the formula R—S—CH($R_1$)—$CH_2$—CHO in which $R_1$ is hydrogen or a $C_1$–$C_4$ alkyl group and R is a $C_1$–$C_{17}$ alkyl group, and the molar ratio of said member to said mercaptoaldehyde being from 0.5:1 to 8:1.

2. A resin according to claim 1, in which the condensation product comprises a bisphenol.

3. A resin having the general formula

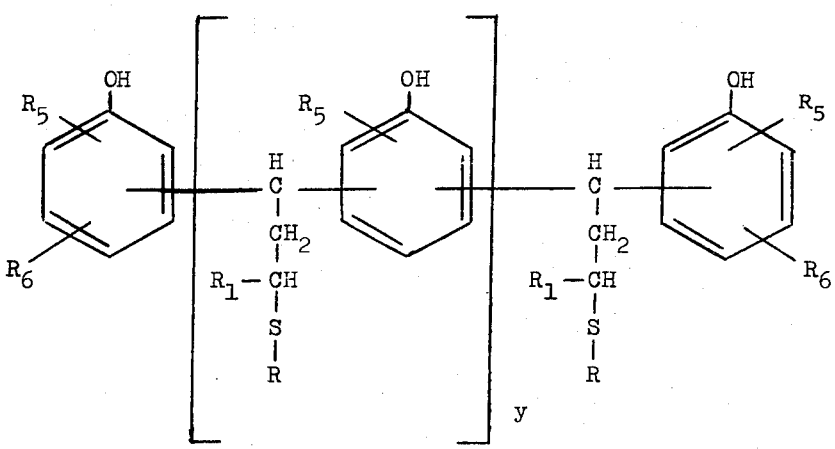

in which the nuclear chain linkage is by ortho or para substitution, the other ortho and/or para position(s) in each nucleus being occupied by $R_5$ or $R_6$ in which $R_5$ and $R_6$ are the same or different and each denotes a member of the group consisting of hydrogen, halogens and $C_1$–$C_8$ aliphatic hydrocarbyl groups; R denotes a $C_1$–$C_{17}$ alkyl group; $R_1$ denotes a member of the group consisting of hydrogen and lower alkyl groups; and y is zero or a positive integer of at least 1.

4. A resin according to claim 3, in which the alkyl group R contains from 2 to 8 carbon atoms.

5. A resin according to claim 4, in which $R_1$ is one of hydrogen and methyl.

6. A resin according to claim 4, in which $R_6$ is in the para position and denotes one of chlorine and bromine.

7. A resin according to claim 3, in which one of $R_5$ and $R_6$ is one of saturated $C_1$–$C_8$ aliphatic hydrocarbyl groups.

8. A resin according to claim 7, in which the hydrocarbyl group is methyl.

9. A resin according to claim 7, in which the hydrocarbyl group is one of tert.butyl and cyclohexyl.

10. A resin according to claim 3, in which one of $R_5$ and $R_6$ is one of unsaturated $C_1$–$C_8$ aliphatic hydrocarbyl groups.

11. A resin according to claim 10, in which the hydrocarbyl group is allyl.

12. A resin according to claim 3, in which y is zero.

13. A resin according to claim 3, in which y is an integer from 1 to 5.

14. A resin according to claim 3, in which one of $R_5$ and $R_6$ is hydrogen.

15. A process for the production of a resin containing phenolic groups and a sulphide linkage, which comprises subjecting a mercaptoaldehyde to condensation with a member of the group consisting of hydroxybenzene and mononuclear, monohydric phenold which contain a halogen or a $C_1$–$C_8$ aliphatic hydrocarbyl group as a substituent in a position ortho or para to the phenolic hydroxyl group and which are unsubstituted in a position ortho or para to the phenolic hydroxyl group, said mercaptoaldehyde having the formula R—S—CH($R_1$)—$CH_2$—CHO in which $R_1$ is hydrogen or a $C_1$–$C_4$ alkyl group and R is a $C_1$–$C_{17}$ alkyl group, and the molar ratio of said member to said mercaptoaldehyde being from 0.5:1 to 8:1.

16. A process according to claim 15, in which $R_1$ is one hydrogen and methyl.

17. A process according to claim 16, in which the alkyl group R is a straight chain.

18. A process according to claim 16, in which the alkyl group R contains from 2 to 12 carbon atoms.

19. A process according to claim 18, in which the alkyl group R contains not more than 8 carbon atoms.

20. A process according to claim 15, in which the phenol has the general formula

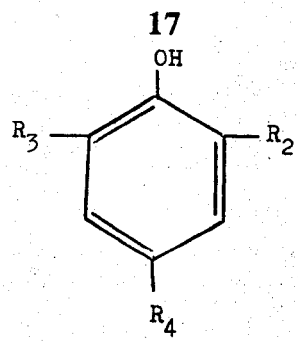

in which each of $R_2$ and $R_3$ denotes a member of the group consisting of hydrogen, halogens and $C_1 - C_8$ aliphatic and cycloaliphatic hydrocarbyl groups and $R_4$ denotes a member of the group consisting of hydrogen, halogens and $C_1 - C_8$ alkyl groups, provided that at least one of $R_2$, $R_3$ and $R_4$ is hydrogen and at least one is other than hydrogen.

21. A process according to claim 20, in which $R_4$ is one of hydrogen, chlorine, bromine and $C_1 - C_4$ alkyl groups.

22. A process according to claim 21, in which one of $R_2$ and $R_3$ is hydrogen and the other is a halogen.

23. A process according to claim 21, in which one of $R_2$ and $R_3$ is hydrogen and the other is a member of the class of saturated and unsaturated $C_1 - C_8$ aliphatic and cycloaliphatic hydrocarbyl groups.

24. A process according to claim 20, in which the phenol is at least one of o-cresol, o-chlorophenol, o-allylphenol and p-chlorophenol.

25. A process according to claim 20, in which the phenol and mercaptoaldehyde are reacted at a temperature from $-30°$ C to $+150°$ C.

26. A process according to claim 25, in which the said molar ratio is in the range from substantially 1:1 to substantially 4:1.

27. A process according to claim 25, in which the temperature is in the range $0° - 80°$ C.

28. A process according to claim 25, in which the condensation is carried out in the presence of a mercaptan as catalyst and with hydrogen chloride as co-catalyst.

* * * * *